United States Patent
Perkins et al.

(10) Patent No.: US 9,662,791 B1
(45) Date of Patent: *May 30, 2017

(54) SYSTEMS AND METHODS FOR ROBOTIC SELF-RIGHT

(71) Applicant: Google Inc., Mountain View, CA (US)

(72) Inventors: Alexander Douglas Perkins, Mountain View, CA (US); Matthew Malchano, Mountain View, CA (US); Shervin Talebinejad, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,500

(22) Filed: Jan. 29, 2016

Related U.S. Application Data (63) Continuation of application No. 14/339,841, filed on Jul. 24, 2014, now Pat. No. 9,308,648.

(51) Int. Cl.
*G06F 19/00* (2011.01)
*B25J 9/16* (2006.01)

(52) U.S. Cl.
CPC ............ *B25J 9/1682* (2013.01); *B25J 9/162* (2013.01); *Y10S 901/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,056,038 A | * | 10/1991 | Kuno | B25J 9/1633 700/260 |
| 5,355,064 A | * | 10/1994 | Yoshino | B62D 57/032 180/8.1 |
| 5,432,417 A | * | 7/1995 | Takenaka | B62D 57/032 180/8.6 |
| 5,459,659 A | * | 10/1995 | Takenaka | B62D 57/032 180/8.1 |
| 6,330,494 B1 | | 12/2001 | Yamamoto | |
| 6,480,761 B2 | * | 11/2002 | Ueno | B25J 19/005 318/568.1 |

(Continued)

FOREIGN PATENT DOCUMENTS

WO  2011038268 A1  3/2011

OTHER PUBLICATIONS

Machine translation of KR-10-2009-0002417.
Machine translation of KR-10-2009-0083495.

*Primary Examiner* — Jonathan L Sample
(74) *Attorney, Agent, or Firm* — McDonnell Boehnen Hulbert & Berghoff LLP (57) ABSTRACT

Example systems and methods for self-righting a robotic device are provided. An example method may include determining an orientation of a bottom surface of a legged robotic device with respect to a ground surface. The method may also include determining that the robotic device is in an unstable position, based on the determined orientation. The method may also include performing a first action configured to return the robotic device to a stable position. The method may also include performing a first action configured to return the legged robotic device to the stable position. The method may also include performing a second action configured to return the legged robotic device to the stable position, if the legged robotic device is in the unstable position after the first action.

18 Claims, 8 Drawing Sheets

(56) References Cited

U.S. PATENT DOCUMENTS

| | | | | |
|---|---|---|---|---|
| 6,484,068 B1* | 11/2002 | Yamamoto | ............ | B25J 19/0016 |
| | | | | 198/380 |
| 6,962,220 B2* | 11/2005 | Takenaka | ............. | B25J 19/0008 |
| | | | | 180/8.1 |
| 7,053,579 B2* | 5/2006 | Moridaira | ............. | B25J 9/1674 |
| | | | | 180/8.6 |
| 7,072,740 B2* | 7/2006 | Iribe | ........................ | G06N 3/008 |
| | | | | 180/8.1 |
| 7,184,858 B2* | 2/2007 | Okazaki | ................... | B25J 9/142 |
| | | | | 118/712 |
| 7,236,852 B2* | 6/2007 | Moridaira | ............ | B62D 57/032 |
| | | | | 318/568.1 |
| 7,260,450 B2* | 8/2007 | Okazaki | ................... | B25J 9/142 |
| | | | | 318/560 |
| 7,313,463 B2* | 12/2007 | Herr | ....................... | B62D 57/032 |
| | | | | 318/568.1 |
| 7,366,587 B2* | 4/2008 | Iribe | ..................... | B62D 57/032 |
| | | | | 180/8.1 |
| 7,386,364 B2 | 6/2008 | Mikami | | |
| 7,657,345 B2* | 2/2010 | Endo | ........................ | B25J 9/161 |
| | | | | 318/568.17 |
| 7,949,428 B2* | 5/2011 | Endo | ........................ | B25J 9/161 |
| | | | | 318/567 |
| 8,155,790 B2* | 4/2012 | Oga | ........................ | B25J 9/1633 |
| | | | | 318/568.2 |
| 8,340,822 B2* | 12/2012 | Nagasaka | .............. | B25J 9/1633 |
| | | | | 700/170 |
| 8,417,382 B2* | 4/2013 | Yoshiike | .............. | B62D 57/032 |
| | | | | 700/245 |
| 8,419,804 B2* | 4/2013 | Herr | ........................ | A61F 2/60 |
| | | | | 623/24 |
| 8,457,830 B2* | 6/2013 | Goulding | ............. | B62D 57/024 |
| | | | | 318/568.11 |
| 8,463,433 B2* | 6/2013 | Nagasaka | .............. | B25J 13/084 |
| | | | | 318/568.16 |
| 9,292,786 B2* | 3/2016 | Nagarajan | ................ | G06N 3/00 |
| 2004/0162636 A1* | 8/2004 | Hattori | ................. | B62D 57/032 |
| | | | | 700/245 |
| 2004/0164697 A1* | 8/2004 | Iribe | ..................... | B25J 13/088 |
| | | | | 318/568.12 |
| 2004/0176875 A1* | 9/2004 | Iribe | ..................... | G06N 3/008 |
| | | | | 700/245 |
| 2004/0205417 A1* | 10/2004 | Moridaira | ............ | B62D 57/032 |
| | | | | 714/48 |
| 2005/0055131 A1* | 3/2005 | Mikami | ................ | B62D 57/032 |
| | | | | 700/245 |
| 2005/0113973 A1* | 5/2005 | Endo | ........................ | B25J 9/161 |
| | | | | 700/245 |
| 2006/0033462 A1* | 2/2006 | Moridaira | .............. | B25J 9/1674 |
| | | | | 318/568.12 |
| 2006/0071625 A1* | 4/2006 | Nakata | .................... | B25J 9/1633 |
| | | | | 318/568.12 |
| 2006/0184276 A1* | 8/2006 | Takenaka | ............. | B62D 57/032 |
| | | | | 700/245 |
| 2007/0013506 A1* | 1/2007 | Takenaka | ............... | B62D 57/032 |
| | | | | 340/500 |
| 2007/0016329 A1* | 1/2007 | Herr | ..................... | B62D 57/032 |
| | | | | 700/250 |
| 2007/0126387 A1* | 6/2007 | Takenaka | ............... | B25J 13/085 |
| | | | | 318/568.2 |
| 2007/0220637 A1* | 9/2007 | Endo | ........................ | B25J 9/161 |
| | | | | 318/568.17 |
| 2008/0231221 A1* | 9/2008 | Ogawa | ..................... | B25J 5/007 |
| | | | | 318/568.12 |
| 2009/0105878 A1* | 4/2009 | Nagasaka | .............. | B25J 13/084 |
| | | | | 700/245 |
| 2009/0272585 A1* | 11/2009 | Nagasaka | .............. | B25J 9/1633 |
| | | | | 180/8.6 |
| 2010/0161116 A1* | 6/2010 | Kwak | .................. | B62D 57/032 |
| | | | | 700/245 |
| 2010/0185330 A1* | 7/2010 | Kwon | .................. | B62D 57/032 |
| | | | | 700/261 |
| 2010/0324699 A1* | 12/2010 | Herr | ......................... | A61F 2/66 |
| | | | | 623/27 |
| 2011/0231050 A1* | 9/2011 | Goulding | ............. | B62D 57/024 |
| | | | | 701/26 |
| 2012/0046789 A1* | 2/2012 | Kwak | .................. | B62D 57/032 |
| | | | | 700/258 |
| 2012/0059518 A1* | 3/2012 | Lee | ...................... | B62D 57/032 |
| | | | | 700/261 |
| 2013/0079929 A1* | 3/2013 | Lim | ...................... | B62D 57/032 |
| | | | | 700/250 |
| 2013/0231822 A1* | 9/2013 | Gouaillier | ............ | B62D 57/032 |
| | | | | 701/23 |
| 2013/0282174 A1 | 10/2013 | Xi | | |
| 2014/0100768 A1 | 4/2014 | Kessens | | |
| 2015/0217448 A1* | 8/2015 | Nagarajan | ............ | B62D 57/032 |
| | | | | 700/245 |

* cited by examiner

SYSTEMS AND METHODS FOR ROBOTIC SELF-RIGHT

CROSS-REFERENCE TO RELATED APPLICATIONS

This application is a continuation of U.S. patent application Ser. No. 14/339,841 filed Jul. 24, 2014, the contents of which are hereby incorporated by reference.

GOVERNMENT RIGHTS

This invention was made with U.S. Government support under Contract No. HR00011-10-C-0025 awarded by DARPA. The Government may have certain rights with regard to the invention.

BACKGROUND

Unless otherwise indicated herein, the materials described in this section are not prior art to the claims in this application and are not admitted to be prior art by inclusion in this section.

Robotic devices may be used for many applications, and may operate in a variety of environments. Unfortunately, during operation, a robotic device may fall or tip over, preventing the robotic device from moving normally. Controlling the robotic device to successfully right itself can be a difficult and time-consuming task for operators. For instance, those controlling the robotic device generally need to determine how to re-orient the robotic device to a desired position, if it is even possible.

SUMMARY

The present application discloses embodiments that relate to self-right procedures for legged robotic devices. In one example, the present application describes a method operable by a computing device. The method may include determining an orientation of a bottom surface of a legged robotic device with respect to a ground surface. The legged robotic device may further include two or more legs extending from a body of the legged robotic device. The method may also include determining that the legged robotic device is in an unstable position based on the determined orientation, wherein the legged robotic device is unable to maintain a stance in the unstable position. The method may also include performing a first action configured to return the legged robotic device to a stable position such that the legged robotic device is able to maintain a stance in the stable position, wherein the first action includes moving a first leg of the legged robotic device from a first position to a second position, such that a distal end of the first leg is further away from the ground surface in the second position than in the first position. A proximal end of the first leg may be coupled to a first side of the legged robotic device. The method may also include extending at least two of the two or more legs of the legged robotic device, if the first action causes the legged robotic device to return to the stable position. The method may also include performing a second action configured to return the legged robotic device to the stable position, if the legged robotic device is in the unstable position after the first action. The second may include extending the distal end of the first leg of the legged robotic device away from the body of the legged robotic device such that a gravitational potential energy of the legged robotic device is increased.

In another aspect, the present application discloses a robotic device. The robotic device may include a body, two or more legs extending form the body, at least one processor, and data storage comprising program logic executable by the at least one processor to cause the robotic device to perform functions. The functions may include determining an orientation of a bottom surface of a robotic device with respect to a ground surface. The functions may also include determining that the robotic device is in an unstable position, based on the determined orientation, wherein the robotic device is unable to maintain a stance in the unstable position. The functions may also include performing a first action configured to return the robotic device to a stable position such that the robotic device is able to maintain a stance in the stable position, wherein the first action includes moving a first leg of the robotic device from a first position to a second position, such that a distal end of the first leg is further away from the ground surface in the second position than in the first position. A proximal end of the first leg may be coupled to a first side of the robotic device. The functions may also include extending at least two of the two or more legs of the robotic device, if the first action causes the robotic device to return to the stable position. The functions may also include performing a second action configured to return the robotic device to the stable position, if the robotic device is in the unstable position after the first action. The second may include extending the distal end of the first leg of the robotic device away from the body of the robotic device such that a gravitational potential energy of the robotic device is increased.

In yet another aspect, the present application discloses a non-transitory computer-readable storage medium having stored thereon instructions, that when executed by a computing device, cause the computing device to carry out functions. The functions may include determining an orientation of a bottom surface of a legged robotic device with respect to a ground surface. The legged robotic device may further include two or more legs extending from a body of the legged robotic device. The functions may also include determining that the legged robotic device is in an unstable position based on the determined orientation, wherein the legged robotic device is unable to maintain a stance in the unstable position. The functions may also include performing a first action configured to return the legged robotic device to a stable position such that the legged robotic device is able to maintain a stance in the stable position, wherein the first action includes moving a first leg of the legged robotic device from a first position to a second position, such that a distal end of the first leg is further away from the ground surface in the second position than in the first position. A proximal end of the first leg may be coupled to a first side of the legged robotic device. The functions may also include extending at least two of the two or more legs of the legged robotic device, if the first action causes the legged robotic device to return to the stable position. The functions may also include performing a second action configured to return the legged robotic device to the stable position, if the legged robotic device is in the unstable position after the first action. The second may include extending the distal end of the first leg of the legged robotic device away from the body of the legged robotic device such that a gravitational potential energy of the legged robotic device is increased.

These as well as other aspects, advantages, and alternatives, will become apparent to those of ordinary skill in the art by reading the following detailed description, with reference where appropriate to the accompanying figures.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

In some example operations, a legged robotic device may need to be capable of autonomously picking itself up from a wide variety of starting positions. For example, a robotic device may encounter an obstacle, trip, and subsequently fall to its side. The robotic device may be configured with a self-right procedure designed to place the robotic device in an upright, stable position prior to standing. The self-right procedure may initially involve determining that the robot is in an unstable position, such as on its side for example. In one example, such a determination may be made by one or more sensors on the robotic device. In another example, the robotic device may determine the position of its center of mass and compare the determined position with the position of the feet of the robotic device. If the center of mass is outside of a polygon defined by the position of the feet, the robotic device may determine it is in an undesirable position and cannot stand up. If the center of mass of the robotic device is within the polygon defined by its feet, the robotic device may determine it is in an upright and stable position and may proceed to stand up.

If the robotic device determines that it is in an unstable position, the robotic device may then initiate one or more actions designed to return the robotic device to a stable position. After each action, the robotic device may make a determination whether or not the robotic device is still in an unstable position. If the robotic device determines that it is no longer in an unstable position, the robotic device may extend its legs to stand up and return to a fully functional mode of operation. If the robotic device determines that it is still in an unstable position, the robotic device may move on to a new action designed to return the robotic device to a stable position. The robotic device may continue to perform self-right actions until a determination is made that it is no longer in an unstable position.

It should be understood that the above examples are provided for illustrative purposes, and should not be construed as limiting. As such, the method may additionally or alternatively includes other features or includes fewer features, without departing from the scope of the invention.

Figure 1:
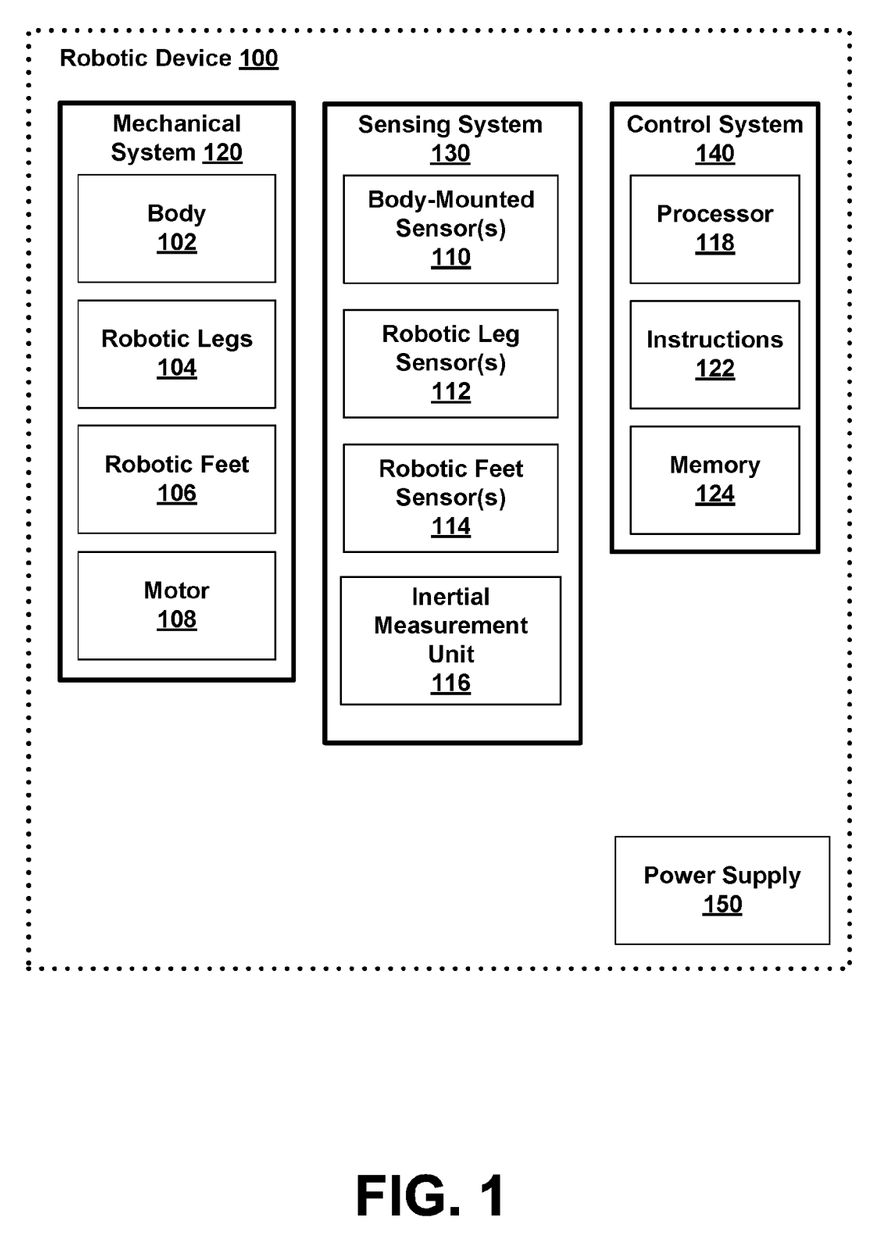
FIG. 1 is a functional block diagram illustrating a robotic device, according to an example embodiment.

Referring now to the figures, FIG. 1 illustrates a functional block diagram illustrating a robotic device 100, according to an example embodiment. The robotic device 100 may include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIG. 1.

The mechanical system 120 may include several components, including a body 102, one or more robotic legs 104, and one or more robotic feet 106 coupled to the one or more robotic legs 104. The mechanical system 120 may additionally include a motor 108, which may be an electric motor powered by electrical power, or may be powered by a number of different energy sources, such as a gas-based fuel or solar power. Additionally, motor 108 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may determine information about the environment that can be used by control system 140 (e.g., a computing device running motion planning software) to determine whether the robotic device 100 is in an upright and stable position or in an unstable position. The control system 140 could be located on the robotic device 100 or could be in remote communication with the robotic device 100. In one particular example, the sensing system 130 may use one or more body-mounted sensors 110 attached to the body 102 of the robotic device 100, which may be 2D sensors and/or 3D depth sensors that sense information about the environment as the robotic device 100 moves. For example, the body-mounted sensors 110 may determine a distance between the body 102 of the robotic device 100 and the ground surface on which the robotic device 100 operates. In further examples, one or more robotic leg sensors 112 may be located on the robotic legs 104 of the robotic device 100. The robotic leg sensors 112 may be contact sensors configured to alert the robotic device when the robotic legs 104 are in contact with the ground surface. In another example, the robotic legs 104 may be coupled to robotic feet 106 that contact the ground surface. In such a case, the robotic device 100 may include one or more robotic feet sensors 114 positioned on the robotic feet 106 of the robotic device 100. The robotic feet sensors 114 may be contact sensors configured to alert the robotic device 100 when the robotic feet 106 are in contact with the ground surface. The information from the robotic legs sensors 112 and/or the robotic feet sensors 114 may be used to determine whether the robotic device 100 is in a stable position or an unstable position, as discussed in more detail below.

The sensing system 130 may further include an inertial measurement unit (IMU) 116. In an illustrative embodiment, IMU 116 may include both an accelerometer and a gyroscope, which may be used together to determine the orientation, position, and/or velocity of the robotic device 100. In particular, the accelerometer can measure the orientation of the robotic device 100 with respect to gravity, while the gyroscope measures the rate of rotation around an axis. IMUs are commercially available in low-cost, low-power packages. For instance, an IMU 116 may take the form of or include a miniaturized MicroElectroMechanical System (MEMS) or a NanoElectroMechanical System (NEMS). Other types of IMUs may also be utilized. The IMU 116 may include other sensors, in addition to accelerometers and gyroscopes, which may help to better determine position and/or help to increase autonomy of the robotic device 100. Two examples of such sensors are magnetometers and pressure sensors. Other examples are also possible.

Many or all of the functions of the robotic device 100 could be controlled by control system 140. Control system 140 may include at least one processor 118 (which could include at least one microprocessor) that executes instructions 122 stored in a non-transitory computer readable medium, such as the memory 124. The control system 140 may also represent a plurality of computing devices that may serve to control individual components or subsystems of the robotic device 100 in a distributed fashion.

In some embodiments, memory 124 may contain instructions 122 (e.g., program logic) executable by the processor 118 to execute various functions of robotic device 100, including those described below in relation to FIG. 2. Memory 124 may contain additional instructions as well, including instructions to transmit data to, receive data from, interact with, and/or control one or more of the mechanical system 120, the sensor system 130, and/or the control system 140.

Figure 2:
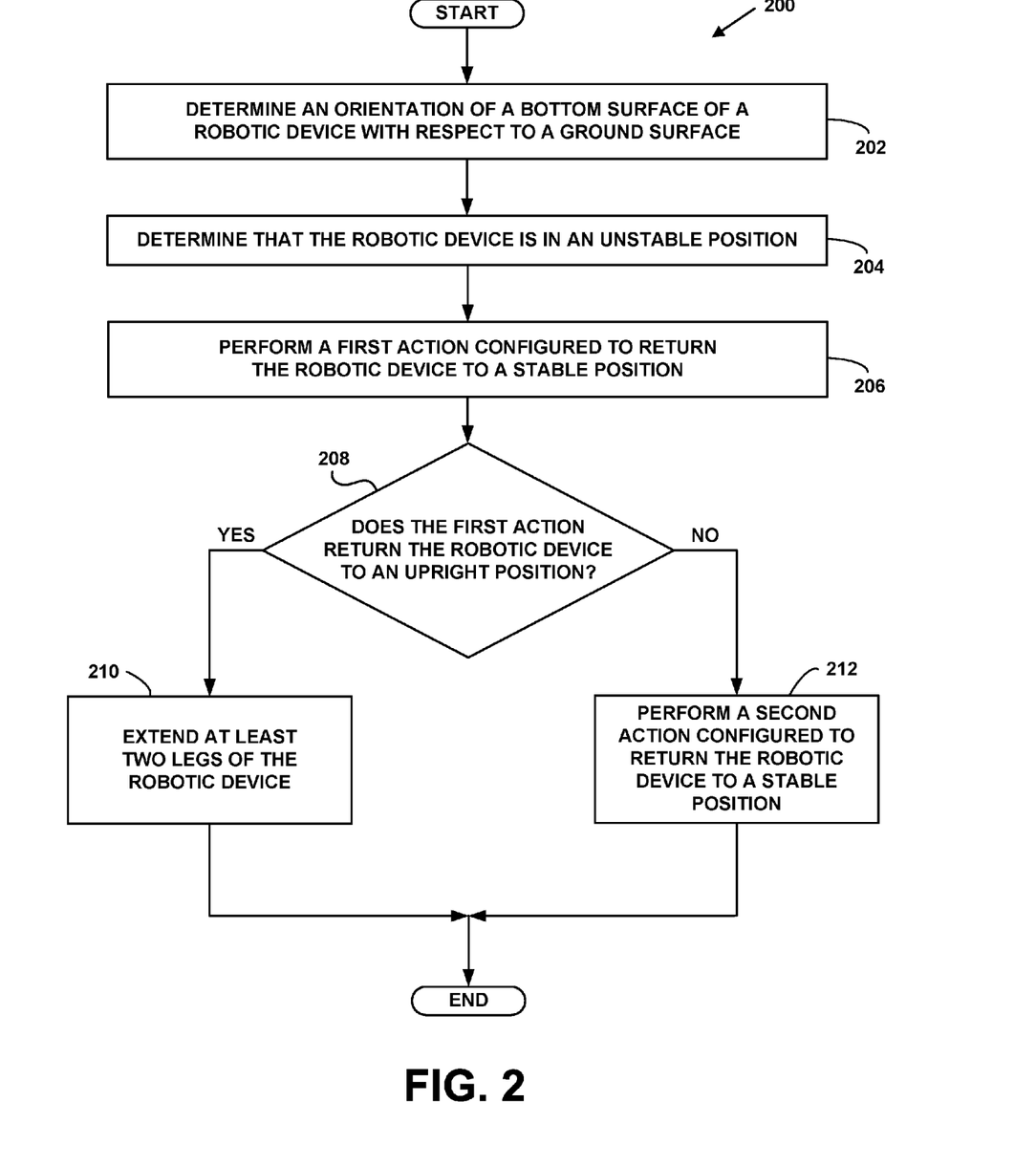
FIG. 2 is a flowchart illustrating an example method.

FIG. 2 is a flow chart of an example method for self-righting a robotic device, in accordance with at least some embodiments described herein. Method 200 shown in FIG. 2 presents an embodiment of a method that, for example, could be used with the systems shown in FIG. 1, for example, or may be performed by a combination of any components of in FIG. 1. Method 200 may include one or more operations, functions, or actions as illustrated by one or more of blocks 202-212. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 200 and other processes and methods disclosed herein, each block in FIG. 2 may represent circuitry that is wired to perform the specific logical functions in the process.

Functions of the method 200 may be fully performed by a computing device, or may be distributed across multiple computing devices and/or a server. The computing device may be incorporated into a robotic device, or the computing device may be an independent component in wireless communication with the robotic device. In some examples, the computing device may receive information from sensors or other components coupled to the computing device, or where the computing device is a server the information can be received from another device that collects the information. The computing device could further communicate with a server to determine information that may facilitate the performance of the method 200.

Referring again to FIG. 2, at block 202, the method 200 includes determining an orientation of a bottom surface of a robotic device with respect to a ground surface. The robotic device may include two or more legs extending from its body, which may be used to maneuver the robotic device. As discussed above in relation to FIG. 1, the robotic device may include a sensing system including an IMU. The IMU may include an accelerometer and a gyroscope, as examples. The IMU may be configured to output data for determining the orientation of the robotic device. One or more processors of the robotic device may receive the data from the IMU, and make a determination of the current orientation of the robotic device. The IMU may detect the current rate of acceleration using one or more accelerometers, and may further detect changes in rotational attributes like pitch, roll, and yaw using one or more gyroscopes.

In another example, the robotic device may include one or more body-mounted sensors attached to the body of the robotic device. Such body-mounted sensors may be 2D sensors and/or 3D depth sensors that sense the ground surface and determine an orientation of the bottom surface of the robotic device. In yet another example, the bottom surface of the robotic device may include one or more contact sensors, such that when the robotic device is in the unstable position, there is not contact between the ground surface and the contact sensors on the bottom surface of the robotic device.

The bottom surface of the robotic device may be shaped such that the gravitational potential energy of the robotic device is reduced based on the robotic device being in a stable position with respect to the ground surface. For example, the bottom surface may be shaped in a semi-circular fashion, such as an egg or domed tortoise shell. Further, the robotic device may have a low center of mass positioned near the bottom surface. The robotic device may accomplish this by positioning its hardware components near its bottom surface. In such a configuration, when the robotic device is on its side the robotic device naturally tends to roll to a stable position. Other arrangements are possible as well.

At block 204, the method 200 includes determining that the robotic device is in an unstable position. Such a determination may be made by one or more processors of the robotic device, using the determined orientation of the bottom surface as an input. The unstable position may include the robotic device positioned on its side in a lying position such that the robotic device is unable to maintain a stance in the unstable position. In the unstable position, the robotic device is unable to maintain a stance, meaning the robotic device is unable to extend its legs to cause the robotic device to stand. In one example, the robotic device may determine that it is in an unstable position by determining a position of its center of mass, and subsequently determining a position of the feet of the robotic device. The robotic device may project the position of the center of mass vertically onto the ground surface. As discussed above, the robotic device may include sensors positioned on the feet to determine a given position of each of the feet. The robotic device may then compare the determined position of the feet with the determined position of the center of mass. If the center of mass is outside of a polygon defined by the position of the feet, the robotic device may determine that it is in an unstable position and cannot stand up. If the center of mass is within the polygon defined by the position of the feet, the robotic device is in an upright and stable position and may proceed to stand up.

In yet another example, as discussed above, the bottom surface of the robotic device may include one or more contact sensors. In such an embodiment, when the robotic device is in the unstable position, there is not contact between the ground surface and the contact sensors on the bottom surface of the robotic device. Therefore, the robotic device may determine that the robotic device is in an unstable position if there is no contact between the ground surface and the contact sensors on the bottom surface of the robotic device. Other examples are possible as well.

At block 206, the method 200 includes performing a first action configured to return the robotic device to a stable position. As discussed above, the robotic device may be in an unstable position lying on a first side of the robotic device. In such a case, the first action may include moving a first leg of the robotic device from a first position to a second position. The first leg may include a distal end that is positioned near the ground surface, and a proximal end that is couple to the first side of the robotic device. In one example, the distal end of the first leg may be coupled to a foot. The distal end of the first leg is further away from the ground surface in the second position than the first position. As such, the first leg may be cleared out of the way such that the gravitational potential energy and shape of the robotic device may return the robot to a stable position. In some examples, the robotic device may include four or more legs. In such an example, the first action may include moving each of the legs positioned on the first side of the robotic device from the first position to the second position.

At block 208, the method 200 includes determining whether or not the first action returns the robotic device to a stable position. In the stable position, the robotic device is able to maintain a stance, meaning the robotic device is able to extend its legs to cause the robotic device to stand. As discussed above, the robotic device may use one or more body-mounted sensors, one or more contact sensors, and/or the IMU system to make this determination. In particular, after performing the first action, the robotic device may receive an indication from the one or more processors of the robotic device of a current position of the bottom surface.

If it is determined that the first action returned the robotic device to a stable position, method 200 continues at block 210 with extending at least two legs of the robotic device. When the robotic device returns to a stable position, it may proceed to any number of postures, including but not limited to sitting, standing, or crawling. For example, in a bipedal robotic device, the robotic device may extend both of its legs to cause the robotic device to stand. In a quadruped robotic device, the robotic device may extend all four of its legs to cause the robotic device to stand. In another example, the quadruped robotic device may only extend two of its four legs. In such an example, the robotic device may extend one leg on a first side of the robotic device and another leg on a second side of the robotic device. Other examples are possible as well. Once the robotic device stands up, it may proceed in a fully functional mode.

If it is determined that the first action did not return the robotic device to a stable position, method 200 continues at block 212 with performing a second action configured to return the robotic device to a stable position. The second action may include extending the distal end of the first leg away from the body of the robotic device. The distal end of the first leg may contact the ground surface and push the robotic device further away from the stable position, thereby increasing the gravitational potential energy of the robotic device. The increased gravitational potential energy and shape of the robotic device may return the robot to a stable position. As discussed above, in some examples the robotic device may include four or more legs. In such an example, the second action may include extending each of the legs positioned on the first side of the robotic device away from the body of the robotic device to increase the gravitational potential energy of the robotic device. Additional actions configured to return the robotic device to a stable position are possible as well, as discussed in more detail below.

According to various embodiments, a self-right system for a legged robotic device is described. For instance, a robotic device may utilize a combination of self-right actions to cause the robotic device to move from an unstable position to a stable position. FIGS. 3A-3G illustrate the robotic device performing various self-right functions, according to an example embodiments.

Figure 3A:
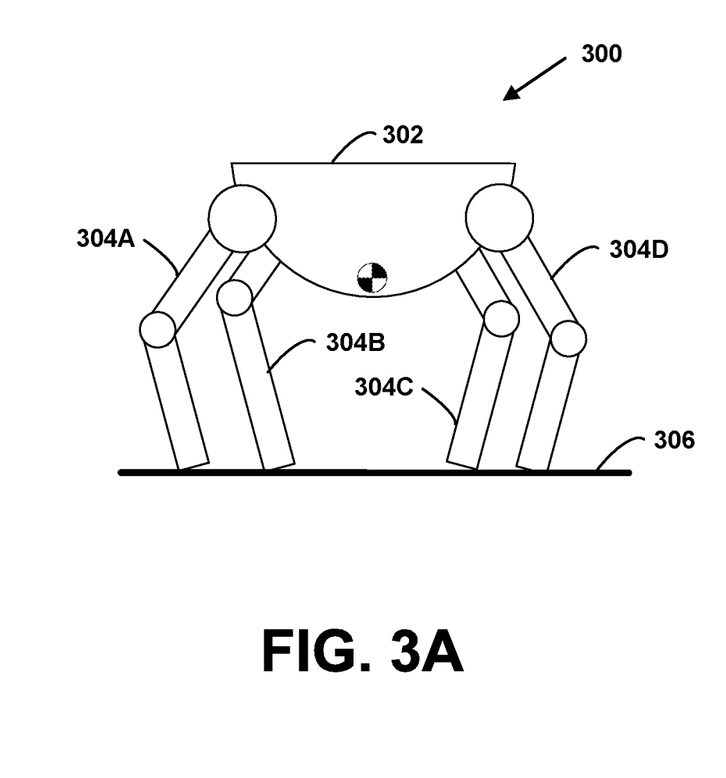
FIGS. 3A-3G illustrate an example robotic device configured to perform functions of the example method, in accordance with at least some embodiments described herein.

FIG. 3A illustrates an example embodiment when the robotic device 300 is in a standing position in a fully functional mode. The robotic device 300 is shown as a quadruped, although other configurations are possible as well. As shown in FIG. 3A, the robotic device 300 may include a body 302, and four legs 304A-304D extending from the body 302. The legs 304A-304D are shown contacting a ground surface 306. The center of mass is shown near the bottom surface of the robotic device 300. The bottom surface of the robotic device is U-shaped, such that when the robotic device 300 is on its side the body 302 naturally tends to roll to a stable position.

Figure 3B:
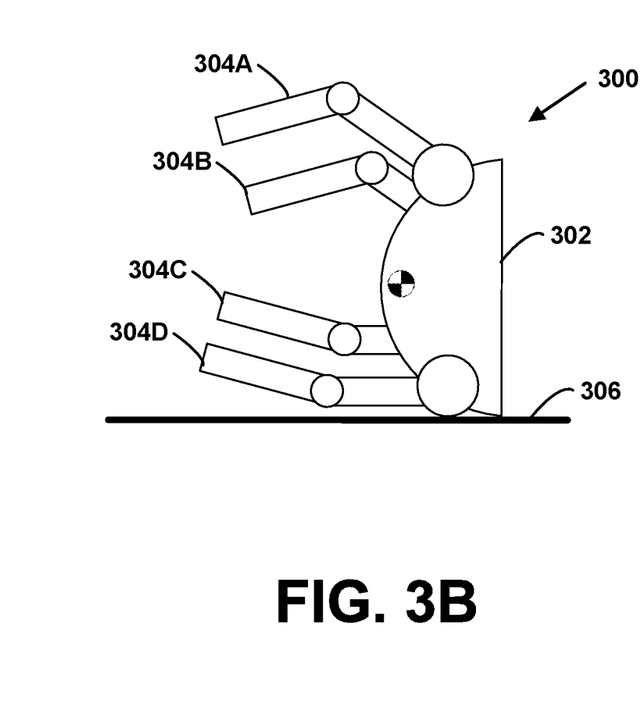

FIG. 3B illustrates an example embodiment when the robotic device 300 is in an unstable position. As discussed above, the robotic device 300 may use one or more body-mounted sensors, one or more contact sensors, and/or an IMU system to determine if it is in an unstable position. As shown in FIG. 3B, the robotic device 300 is on its left side, with legs 304C and 304D on the ground side, and legs 304A and 304B on the sky side. The robotic device 300 is unable to maintain a stance in the unstable position shown in FIG. 3B.

Figure 3C:
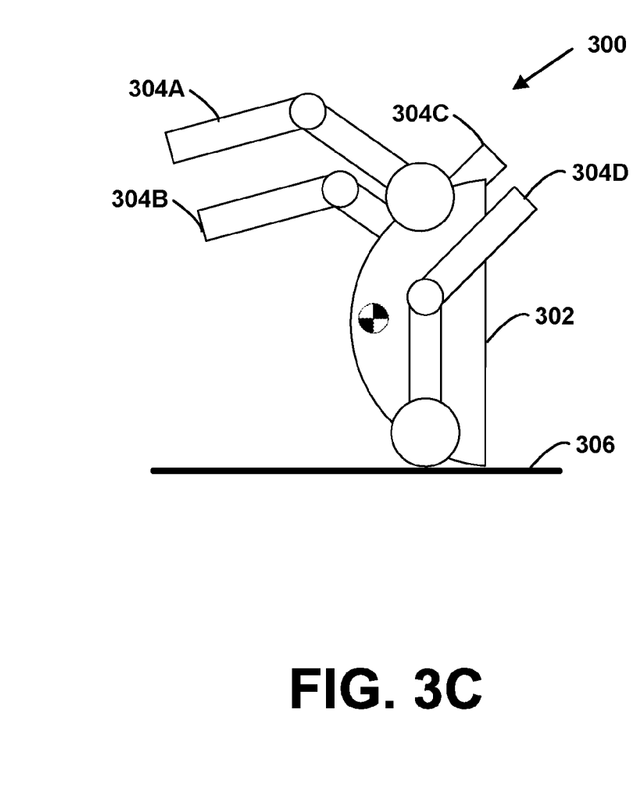

FIG. 3C illustrates an example action configured to return the robotic device 300 to a stable position. As discussed above in relation to the first action, the robotic device 300 may move its ground side legs 304C, 304D from a first position (e.g., the position shown in FIG. 3B) to a second position (e.g., the position shown in FIG. 3C). The distal ends of the ground side legs 304C, 304D are further away from the ground surface in the second position than in the first position. By moving the ground side legs 304C, 304D out of the way, the gravitational potential energy and shape of the robotic device 300 may return the robot to a stable position.

Figure 3D:
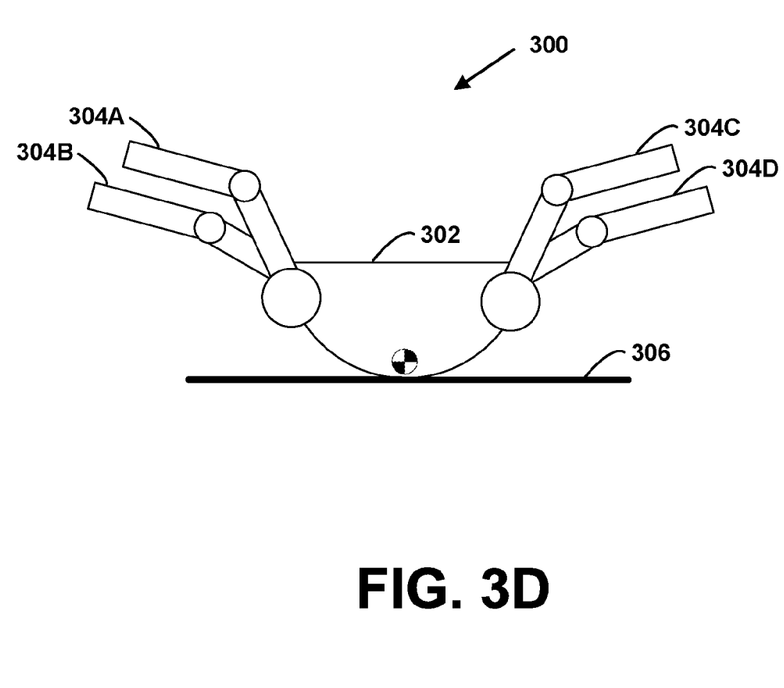

FIG. 3D illustrates an example embodiment when the robotic device 300 is in a stable position. In the stable position, the robotic device 300 is stable and can extend its legs 304A-304D to stand and return to a fully functional mode of operation. The robotic device 300 may proceed to any number of postures from the stable position, including but not limited to sitting, standing, or crawling. As discussed above, the bottom surface of the robotic device 300 may include one or more contact sensors. In such an embodiment, when the robotic device is in the stable position, there is contact between the ground surface 306 and the contact sensors on the bottom surface of the robotic device 300. Therefore, the robotic device 300 may determine that the robotic device 300 is in a stable position if there is contact between the ground surface 306 and the contact sensors on the bottom surface of the robotic device 300.

Figure 3E:
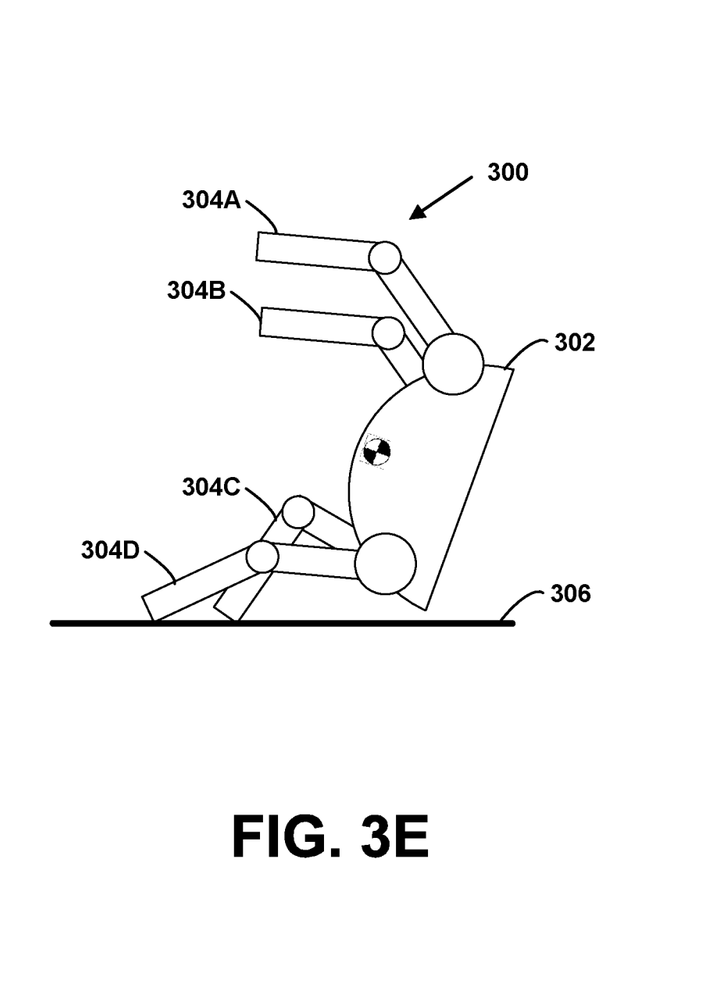

FIG. 3E illustrates another example action configured to return the robotic device 300 to a stable position. As discussed above in relation to the second action, the robotic device 300 may move its ground side legs 304C, 304D away from the body 302 of the robotic device 300. The distal ends of the ground side legs 304C, 304D may contact the ground surface 306 and push the robotic device 300 further away from the stable position, thereby increasing the gravitational potential energy of the robotic device 300. The increased gravitational potential energy and shape of the bottom surface of the robotic device 300 may return the robotic device 300 to a stable position. In one example, the robotic device 300 may extend its ground side legs 304C, 304D to push the robotic device further away from the stable position, and then subsequently move its ground side legs 304C, 304D to the position shown in FIG. 3C. Other examples are possible as well.

Figure 3F:
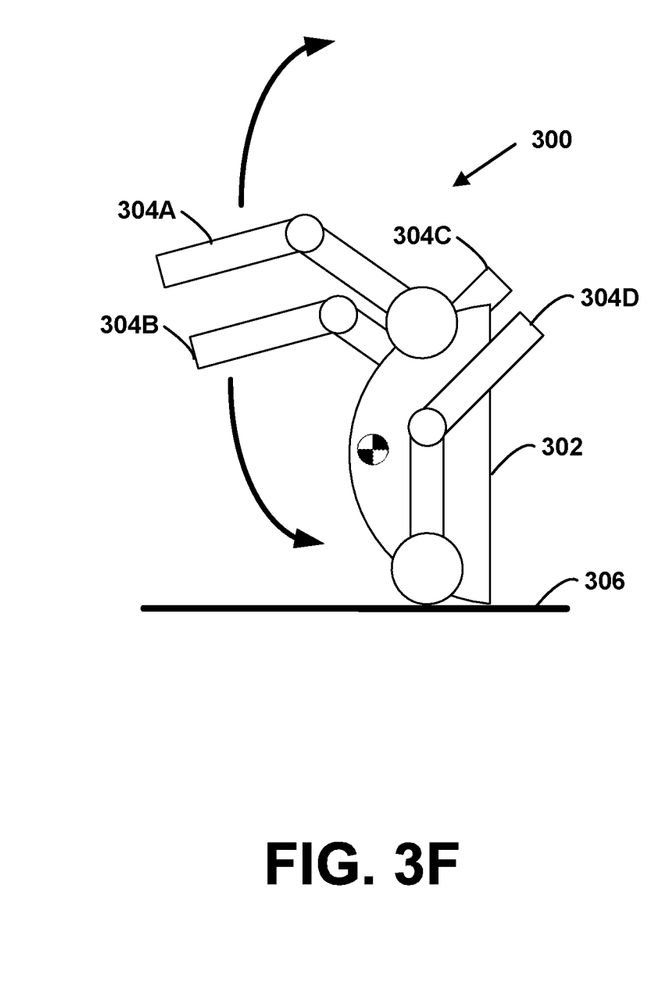

In one embodiment, if the robotic device 300 is still in an unstable position after the second action, the robotic device 300 may perform a third action configured to return the robotic device 300 to a stable position. FIG. 3F illustrates yet another example action configured to return the robotic device 300 to a stable position. The robotic device 300 may extend its sky side legs 304A, 304B to lower the center of mass of the robotic device 300. Further, the robotic device 300 may move its sky side legs 304A, 304B away from the ground surface 306 and/or towards the ground surface 306 so as to provide an angular momentum to the robotic device 300. The robotic device 300 may alternate between moving its sky side legs 304A, 304B away from the ground surface 306, and towards the ground surface 306 to rock the robotic device 300 in an attempt to return the robotic device 300 to the stable position.

Figure 3G:
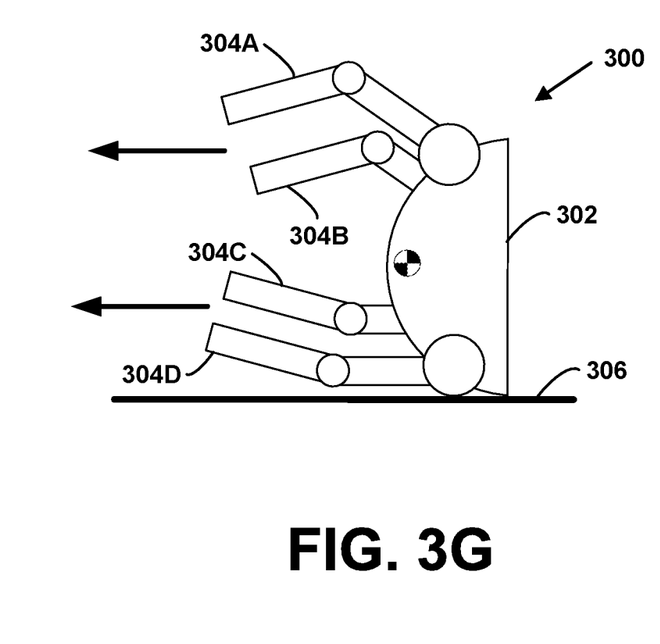

FIG. 3G illustrates yet another example action configured to return the robotic device 300 to a stable position. The robotic device 300 may extend its ground side legs 304C, 304D away from the body 302 to push off of a potential obstruction (e.g., a rock, a wall, etc.) that may be preventing the robotic device 300 from returning to the stable position. In addition, the robotic device 300 may extend its sky side legs 304A, 304B to achieve the same goal.

The robotic device may perform one or more of the actions described above in relation to FIGS. 3A-3G to attempt to return the robotic device 300 to a stable position. After each action, the robotic device 300 may make a determination whether or not the performed action returned the robotic device 300 to the stable position. If the robotic device 300 determines it is in the stable position, the robotic device 300 may stand and continue to operate in a fully functional mode. If the robotic device 300 determines it is still in an unstable position, it may continue to perform the described actions until the robotic device 300 determines it is no longer in an unstable position.

Figure 4:
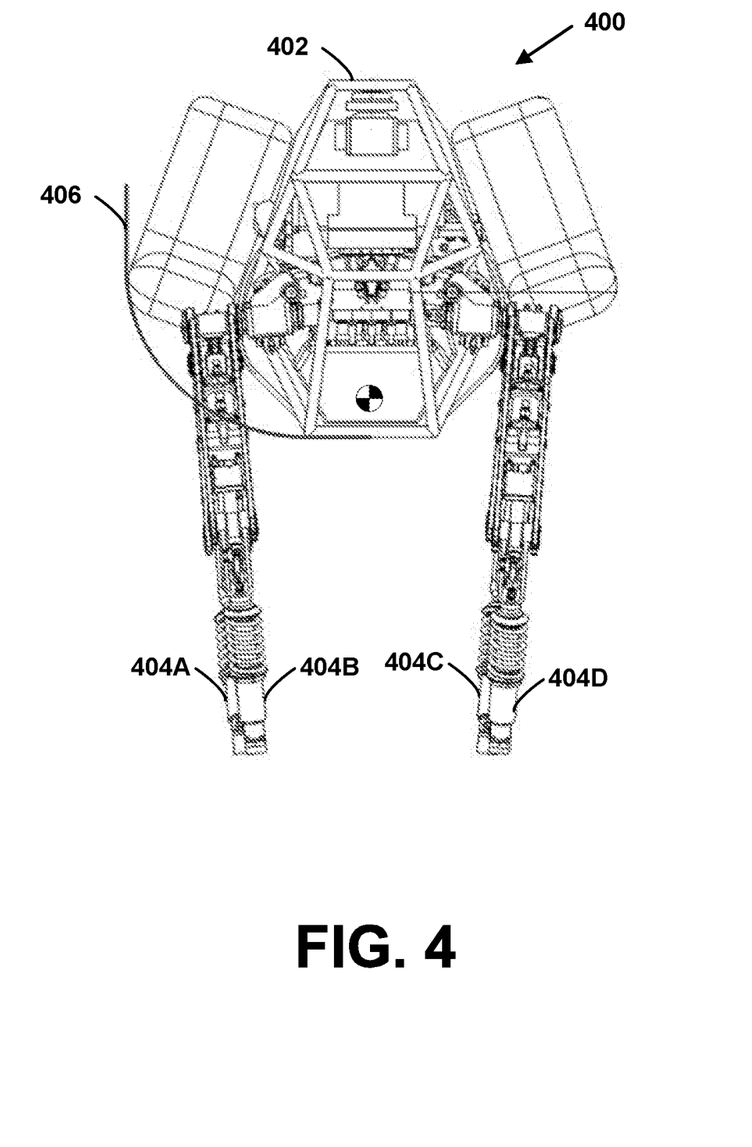
FIG. 4 illustrate another example robotic device configured to perform functions of the example method, in accordance with at least some embodiments described herein.

FIG. 4 illustrates another example robotic device 400 configured to perform functions of the example method, in accordance with at least some embodiments described herein. In particular, FIG. 4 illustrates an example robotic device 400 having a body 402, and four legs 404A-404D extending from the body 402. The body 402 is shown with a low center of mass, and a bottom surface with a profile 406 such that the gravitational potential energy of the robotic device 400 is reduced based on the robotic device 400 being in a stable position. The robotic device 400 may be configured to perform the various self-right actions described above in relation to FIGS. 3A-3G.

Figure 5:
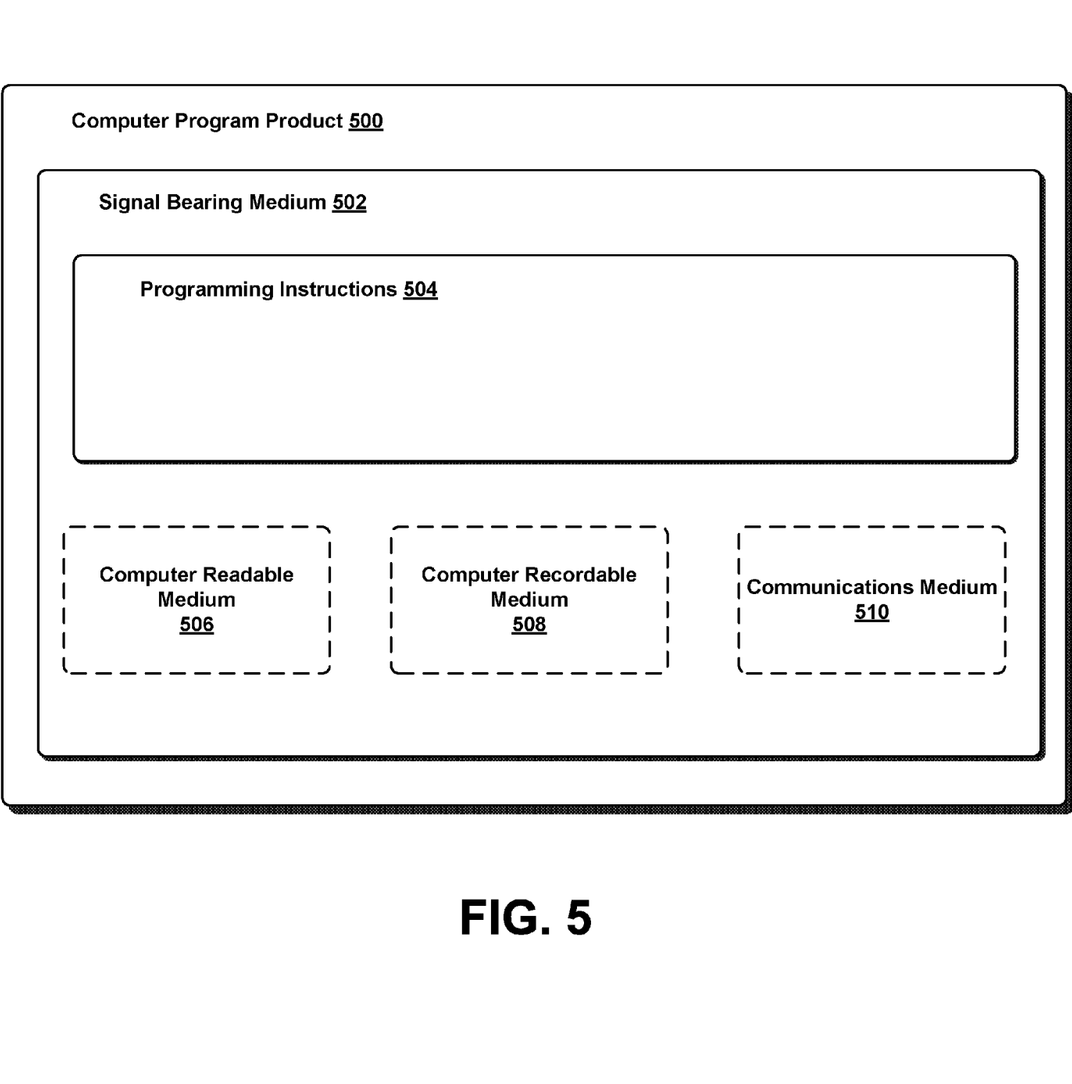
FIG. 5 depicts a computer-readable medium configured according to an example embodiment.

FIG. 5 illustrates a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 can be a computer-readable medium 506, such as, but not limited to, a hard disk drive, a Compact Disc (CD), a Digital Video Disk (DVD), a digital tape, memory, etc. In some implementations, the signal bearing medium 502 can be a computer recordable medium 508, such as, but not limited to, memory, read/write (R/W) CDs, R/W DVDs, etc. In some implementations, the signal bearing medium 502 can be a communications medium 510, such as, but not limited to, a digital and/or an analog communication medium (e.g., a fiber optic cable, a waveguide, a wired communications link, a wireless communication link, etc.). Thus, for example, the signal bearing medium 502 can be conveyed by a wireless form of the communications medium 510.

The one or more programming instructions 504 can be, for example, computer executable and/or logic implemented instructions. In some examples, a computing device such as the processor 118 of FIG. 1 is configured to provide various operations, functions, or actions in response to the programming instructions 504 conveyed to the processor 118 by one or more of the computer-readable medium 506, the computer recordable medium 508, and/or the communications medium 510.

The non-transitory computer-readable medium could also be distributed among multiple data storage elements, which could be remotely located from each other. The device that executes some or all of the stored instructions could be a client-side computing device. Alternatively, the device that executes some or all of the stored instructions could be a server-side computing device.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method operable by a computing device, the method comprising:
    determining an orientation of a bottom surface of a legged robotic device with respect to a ground surface, wherein the legged robotic device includes two or more legs extending from a body of the legged robotic device;
    based on the determined orientation, determining that the legged robotic device is in an unstable position, wherein the unstable position comprises the legged robotic device positioned on a first side of the legged robotic device in a lying position such that the legged robotic device is unable to maintain a stance in the unstable position; and
    providing, by the computing device, instructions to perform a first action configured to return the legged robotic device to a stable position such that the legged robotic device is able to maintain a stance in the stable position, wherein the first action includes moving a first leg of the legged robotic device from a first position to a second position, such that a distal end of the first leg is further away from the ground surface in the second position than in the first position, and wherein a proximal end of the first leg is coupled to a first side of the legged robotic device.

2. The method of claim 1, further comprising:
    if the first action causes the legged robotic device to return to the stable position, providing instructions to extend at least two of the two or more legs of the legged robotic device; and
    if the legged robotic device is in the unstable position after the first action, providing, by the computing device, instructions to perform a second action configured to return the legged robotic device to the stable position.

3. The method of claim 2, further comprising:
    if the second action causes the legged robotic device to return to the stable position, providing instructions to extend at least two of the two or more legs of the legged robotic device; and
    if the legged robotic device is in the unstable position after the second action, performing a third action configured to return the legged robotic device to the stable position.

4. The method of claim 3, wherein the third action comprises extending a distal end of a second leg of the legged robotic device away from the body of the legged robotic device, and wherein a proximal end of the second leg is coupled to a second side of the legged robotic device.

5. The method of claim 4, wherein the third action further comprises extending the distal end of the first leg of the legged robotic away from the body of the legged robotic device at substantially the same time as extending the distal end of the second leg.

6. The method of claim 3, wherein the third action comprises moving the second leg away from the ground surface, so as to provide an angular momentum to the legged robotic device.

7. The method of claim 3, further comprising:
    if the third action causes the legged robotic device to return to the stable position, providing instructions to extend at least two of the two or more legs of the legged robotic device; and
    if the legged robotic device is in the unstable position after the third action, performing the first action configured to return the legged robotic device to the stable position.

8. The method of claim 1, wherein determining the legged robotic device is in an unstable position comprises:
    determining a position of a center of mass of the legged robotic device;
    determining a position of two or more feet of the legged robotic device, wherein the two or more feet are coupled to the two or more legs of the legged robotic device; and
    determining that the position of the center of mass of the legged robotic device is outside of a polygon defined by the determined position of the two or more feet of the legged robotic device.

9. The method of claim 1, wherein determining the legged robotic device is in the stable position comprises:
    determining a position of a center of mass of the legged robotic device;
    determining a position of two or more feet of the legged robotic device, wherein the two or more feet are coupled to the two or more legs of the legged robotic device; and
    determining that the position of the center of mass of the legged robotic device is within a polygon defined by the determined position of the two or more feet of the legged robotic device.

10. The method of claim 1, wherein the bottom surface of the legged robotic device is shaped such that a gravitational potential energy of the legged robotic device is reduced based on the body of the legged robotic device being in the stable position.

11. A robotic device including:
    a body;
    two or more legs extending from the body;
    at least one processor; and
    data storage comprising program logic executable by the at least one processor to cause the robotic device to perform functions comprising:
        determining an orientation of a bottom surface of a robotic device with respect to a ground surface;
        based on the determined orientation, determining that the legged robotic device is in an unstable position, wherein the unstable position comprises the legged robotic device positioned on a first side of the legged robotic device in a lying position such that the legged robotic device is unable to maintain a stance in the unstable position; and performing a first action configured to return the legged robotic device to a stable position such that the legged robotic device is able to maintain a stance in the stable position, wherein the first action includes moving a first leg of the legged robotic device from a first position to a second position, such that a distal end of the first leg is further away from the ground surface in the second position than in the first position, and wherein a proximal end of the first leg is coupled to a first side of the legged robotic device.

12. The robotic device of claim 11, wherein the robotic device includes an inertial measurement unit (IMU) including an accelerometer and a gyroscope, and wherein the IMU outputs data for determining the orientation of the robotic device with respect to the ground surface.

13. The robotic device of claim 11, wherein the functions further comprise:
if the first action causes the legged robotic device to return to the stable position, extending at least two of the two or more legs of the legged robotic device; and
if the legged robotic device is in the unstable position after the first action, performing a second action configured to return the legged robotic device to the stable position.

14. The robotic device of claim 11, wherein the functions further comprise:
if the second action causes the robotic device to return to the stable position, extending at least two of the two or more legs of the robotic device; and
if the robotic device is in the unstable position after the second action, performing a third action configured to return the robotic device to the stable position.

15. The robotic device of claim 14, wherein the functions further comprise:
if the third action causes the robotic device to return to the stable position, extending at least two of the two or more legs of the robotic device; and
if the robotic device is in the unstable position after the third action, performing the first action configured to return the robotic device to the stable position.

16. A non-transitory computer-readable storage medium having stored thereon instructions, that when executed by a computing device, cause the computing device to carry out functions comprising:

determining an orientation of a bottom surface of a legged robotic device with respect to a ground surface, wherein the legged robotic device includes two or more legs extending from a body of the legged robotic device;

based on the determined orientation, determining that the legged robotic device is in an unstable position, wherein the unstable position comprises the legged robotic device positioned on a first side of the legged robotic device in a lying position such that the legged robotic device is unable to maintain a stance in the unstable position; and providing, by the computing device, instructions to perform a first action configured to return the legged robotic device to a stable position such that the legged robotic device is able to maintain a stance in the stable position, wherein the first action includes moving a first leg of the legged robotic device from a first position to a second position, such that a distal end of the first leg is further away from the ground surface in the second position than in the first position, and wherein a proximal end of the first leg is coupled to a first side of the legged robotic device.

17. The non-transitory computer-readable storage medium of claim 16, wherein the functions further comprise:
if the first action causes the legged robotic device to return to the stable position, providing instructions to extend at least two of the two or more legs of the legged robotic device; and
if the legged robotic device is in the unstable position after the first action, providing instructions to perform a second action configured to return the legged robotic device to the stable position.

18. The non-transitory computer-readable storage medium of claim 17, wherein the functions further comprise:
if the second action causes the legged robotic device to return to the stable position, providing instructions to extend at least two of the two or more legs of the legged robotic device; and
if the legged robotic device is in the unstable position after the second action, providing instructions to perform a third action configured to return the legged robotic device to the stable position.

* * * * *